US007565282B2

(12) United States Patent  
Carus et al.

(10) Patent No.: US 7,565,282 B2  
(45) Date of Patent: Jul. 21, 2009

(54) SYSTEM AND METHOD FOR ADAPTIVE AUTOMATIC ERROR CORRECTION

(75) Inventors: Alwin B Carus, Waban, MA (US);  
Larissa Lapshina, Shirley, MA (US);  
Bernardo Rechea, Belmont, MA (US);  
Amy J. Uhrbach, Needham, MA (US)

(73) Assignee: Dictaphone Corporation, Stratford, CT (US)

(*) Notice: Subject to any disclaimer, the term of this patent is extended or adjusted under 35 U.S.C. 154(b) by 453 days.

(21) Appl. No.: 11/105,905

(22) Filed: Apr. 14, 2005

(65) Prior Publication Data

US 2006/0235687 A1 Oct. 19, 2006

(51) Int. Cl.  
*G06F 17/27* (2006.01)  
*G10L 15/18* (2006.01)

(52) U.S. Cl. .......................... 704/9; 704/251; 704/257; 715/256

(58) Field of Classification Search .................. None  
See application file for complete search history.

(56) References Cited

U.S. PATENT DOCUMENTS

| | | | |
|---|---|---|---|
| 6,327,561 B1 | 12/2001 | Smith et al. | |
| 6,418,410 B1* | 7/2002 | Nassiff et al. | 704/251 |
| 2006/0167686 A1* | 7/2006 | Kahn | 704/235 |
| 2007/0106494 A1* | 5/2007 | Detlef et al. | 704/9 |

OTHER PUBLICATIONS

Zafar et al., "A simple error classification system for understanding sources of error in automatic speech recognition and human transcription", International Journal of Medical Informatics, vol. 73, Issue 9, pp. 719-730 (Sep. 2004).*

Yamaguchi et al., "Applying Example Based Error Correction Selectively", IEEE Workshop on Automatic Speech Recognition and Understanding, Nov. 30-Dec. 3, 2003 pp. 162-167.*

Ringger et al., "Error correction via a post-processor for continuous speech recognition", 1996 IEEE International Conference on Acoustics, Speech, and Signal Processing, pp. 427-430, vol. 1, May 7-10, 1996.*

A. V. Aho, R. Sethi, and J. D. Ullman, *Compilers*, Addison-Wesley Publ. Co., 1986, 1988, Ch. 3, pp. 83-158.

(Continued)

*Primary Examiner*—David R Hudspeth  
*Assistant Examiner*—Brian L Albertalli  
(74) *Attorney, Agent, or Firm*—Kelley Drye & Warren LLP (57) ABSTRACT

A method for adaptive automatic error and mismatch correction is disclosed for use with a system having an automatic error and mismatch correction learning module, an automatic error and mismatch correction model, and a classifier module. The learning module operates by receiving pairs of documents, identifying and selecting effective candidate errors and mismatches, and generating classifiers corresponding to these selected errors and mismatches. The correction model operates by receiving a string of interpreted speech into the automatic error and mismatch correction module, identifying target tokens in the string of interpreted speech, creating a set of classifier features according to requirements of the automatic error and mismatch correction model, comparing the target tokens against the classifier features to detect errors and mismatches in the string of interpreted speech, and modifying the string of interpreted speech based upon the classifier features.

11 Claims, 5 Drawing Sheets

OTHER PUBLICATIONS

G. Greffenstette and P. Tapanainen, What Is a Word, What Is a Sentence? Problems of Tokenization, *3rd Conference on Computational Lexicography and Text Research, Complex '94*, Budapest, Jul. 7-10, 1994.

M. D. Riley, Some Applications of Tree-Based Modelling To Speech and Language Indexing, *Proceedings of the DARPA Speech and Natural Language Workshop*, Morgan Kaufman, 1989, pp. 339-352.

D. D. Palmer, Satz—An Adaptive Sentence Segmentation System, M.S. Thesis and UC-Berkeley Technical Report UCB/CSD 94/846, University of California, Berkeley, Computer Science Division, 1994.

J.C. Reynar and A. Ratnaparkhi, A Maximum Entropy Approach to Identifying Sentence Boundaries, *Proceedings of the Fifth Conference on Applied Natural Language Processing*, Washington D.C., 1997, pp. 16-19.

D. D. Palmer and M. A. Hearst, Adaptive Multilingual Sentence Boundary Disambiguation, *Computational Linguistics*, 23(2), 1997.

A. Mikheev, Tagging Sentence Boundaries, *NACL 2000 (Seattle) ACL* Apr. 2000, pp. 264-271.

H. Schmid, Unsupervised Learning of Period Disambiguation for Tokenisation, Internal Report, IMS, University of Stuttgart, Apr. 2000.

D. Yarowsky, Homograph Disambiguation In Text-To-Speech Synthesis, *Progress In Speech Synthesis*, J. van Santen, R. Sproat, J. Olive, and J. Hirschberg (eds.), Springer-Verlag, 1996, pp. 159-175.

D. Yarowsky, Decision Lists for Lexical Ambiguity Resolution: Application to Accent Restoration in Spanish and French, *Proceedings of the 32nd Annual Meeting of the Association for Computational Linguistics*, Las Cruces, NM, 1994, pp. 88-95.

D. Yarowsky, A Comparison of Corpus-Based Techniques for Restoring Acents in Spanish and French Text, *Proceedings, 2nd Annual Workshop on Very Large Corpora*, Kyoto, 1994, pp. 19-32.

R. Sproat, Multilingual Text Analysis for Text-To-Speech Synthesis, *ECAI Workshop on Extended Finite-State Models of Language*, Aug. 1996.

R. Sproat, A. W. Black, S. Chen, S. Kumar, M. Ostendorf, and C. Richards, Normalization of Non-Standard Words: WS '99 Final Report, Sep. 13, 1999, pp. 1-78, In *Computer Speech and Language*, 15(3), 2001, pp. 287-333.

T. Strzalkowski and R. Brandow, A Natural Language Correction Model for Continuous Speech Recognition, *Proceedings of the Fifth Workshop on Very Large Corpora*, pp. 168-177, Aug. 1997; http://acl.ldc.upenn.edu/W/W97/W97-0117.pdf.

M. Rayner et al., Combining Knowledge Sources to Reorder N-Best Speech Hypothesis List, *Proceedings DARPA Speech and Natural Language Workshop*, 1994; http://acl.ldc.upenn.edu/H/H94/H94-1040.pdf.

M. Ostendorf et al., Integration of Diverse Recognition Methodologies through Reevaluation of N-Best Sentence Hypotheses, *Proceedings of DARPA and Natural Language Workshop*, 1991; http:acl.ldc.upenn.edu/H/H91/H91-1013.pdf.

L. Norton et al., Recent Improvements and Benchmark Results for the Paramax ATIS System, *Proceedings of DARPA Workshop on Speech and Natural Language*, 1992; http://acl.ldc.upenn.edu/H/H92/H92-1017.pdf.

L. Hirschman, The Roles of Language Processing in a Spoken Language Interface, *Voice Communication Between Humans and Machines*, National Academy of Sciences, 1994, pp. 217-237; http://www.pnas.org/cgi/reprint/92/22/9970.

R. C. Moore, Integration of Speech with Natural Language Processing, *Voice Communication Between Humans and Machines*, National Academy of Sciences, 1994, pp. 254-271; http://www.pnas.org/cgi/reprint/92/22/9983.

J. Kupiec, Probalilistic Models of Short and Long Distance Word Dependencies in Running Text, *Proceedings of DARPA Speech and Natural Language Workshop*, 1992, pp. 290-295; http://acl.ldc.upenn.edu/H/H89/H89-1054.pdf.

H. Murveit and R. Moore, Integrating Natural Language Constraints into HMM-Based Speech Recognition, IEEE, 1990, pp. 573-576.

G. Maltese and F. Mancini, An Automatic Technique to Include Grammatical and Morphological Information in a Trigram-Based Statistical Language Model, *IEEE International Conference on Acoustics, Speech, and Signal Processing*, 1992, pp. 157-160.

R. Schwartz et al., On Using Written Language Training Data for Spoken Language Modelling, *Proceedings of Human Language Technology Workshop*, Morhan Kaufmann Publishers, Inc., 1994, pp. 94-98; http://acl.ldc.upenn.edu/H/H94/H94-1016.pdf.

E. K. Ringger and J. F. Allen, Error Correction via a Post-Processor for Continuous Speech Recognition, *In Proc. Of ICASSP-96, IEEE-96*, 1996.

* cited by examiner

SYSTEM AND METHOD FOR ADAPTIVE AUTOMATIC ERROR CORRECTION

BACKGROUND OF THE INVENTION

The present invention relates generally to a system and method for automatic speech recognition and, more specifically, to a system and method for automatically identifying, predicting, and implementing edits desired to the output of automatic speech recognition applications.

Even when there is no speech recognition error, natural speech does not always correspond to the desired content and format of written documents. Such lack of correspondences is due to speech recognition errors, different conventions for spoken and formal written language, modifications during the editing and proofreading process. The lack of correspondences also often are repetitive.

Conventional speech recognition systems interpret speech by applying a variety of speech models, including acoustic models (AM) and linguistic models (LM). These speech models are essentially statistical models based on the combination of patterns of sounds, words, and even phrases. AMs are based on particular patterns of sounds or other acoustic units, while LMs are based on specific patterns of words or phrases.

Because natural speech does not always correspond closely to conventional speech models, typical speech recognition systems are prone to make errors which later must be corrected. These errors often are attributable to speaker-related phenomena. As such, many errors in the speech recognition process are repetitive. That is, speech recognition systems are prone to commit the same errors with certain words or phrases on a consistent basis.

Some errors and mismatches between speech and written output are attributable to the user's inability to speak the native language or differences between the conventions of written versus dictated language styles. These errors and mismatches are recurrent as the user continues to repeat words or phrases that fail to match with the acoustic and linguistic models or with written language style. For example, a user speaking Cantonese, a dialect of Chinese, inherently will trigger certain errors as the speech recognition software attempts to reconcile the Cantonese dialect with standard Chinese.

Other commonly-repeated errors or mismatches arise from the industry in which the speech recognition engine is used. Speakers in technical industries typically have frequently-used terms or jargon that may not appear in ordinary conversation and, therefore, are not readily understood by speech recognition systems. Other such jargon may be correctly recognized but may not be appropriate for final documents. As these terms are common to a particular industry, the speech recognition system continues to either misinterpret the terms or to print jargon that requires more formal wording, thereby propagating the same errors or mismatches throughout the interpreted speech. For instance, the medical or health care industry has scores of peculiar terminology not found in conversational language. The acoustic and linguistic models applied by the speech recognition system may lead to the improper interpretation of certain industry-specific terms. Alternatively, speakers may use shorthand or a telegraphic style in speech that must be written out more explicitly in final reports. As these terms may be used numerous times during the transcription of medical records, the errors and mismatches from the speech recognition system will be repeated document after document.

Still other recurrent errors arise from limitations in the speech recognition system itself, including both the speech recognition device and speech recognition applications. As a speech recognition system uses specific devices with specific applications, which are based on specific acoustic and linguistic models, any words or phrases that are improperly interpreted by the speech recognition system may be improperly interpreted on subsequent occasions, thereby repeating the same error.

A number of improved speech recognition systems have been developed; however, these systems have had limited success. For instance, several systems have been developed with more robust speech recognition models in an effort to eliminate errors altogether. These improved speech recognition systems use so-called larger "N-grams" in place of more conventional acoustic and linguistic models with trigrams to detect and interpret speech commands. Larger N-grams are more comprehensive than trigrams and, as such, consume considerably more space in the system's memory. Yet, even the most advanced speech models such as those with larger N-grams provide only marginally improved speech recognition capabilities, as these models only reduce errors stemming from the speech recognition device itself. Mismatches and errors resulting from the user and the industry continue to occur repeatedly, as larger N-grams do not address these limitations.

Many speech recognition systems have attempted to advance the art by learning from the specific user. By comparing the user's speech against known expressions, the speech recognition systems are able to adjust or improve upon conventional speech models. In doing this, the speech recognition system can fine-tune the speech models to the specific user or industry, thereby reducing future errors and mismatches. This process, often referred to as learning from so-called "positive evidence," has had only modest success. Most notably, learning from positive evidence is a slow process, requiring considerable training. Additionally, specific errors or mismatches may continue to be repeated as the speech recognition system is only modifying the speech models based on the positive evidence and not addressing specific mismatches, errors, or types of errors.

There are relatively few speech recognition systems that are adapted to learn from so-called "negative evidence." That is, few systems actually are configured to learn from actual errors or mismatches, particularly those which are systematically repeated. Additionally, known adaptive techniques are unable to account for the acoustic and speaker-related phenomena discussed above, particularly errors arising from the user's inability to speak the native language.

Accordingly, there is a need in the art for a speech recognition system with automatic error and mismatch correction capabilities for detecting and resolving systematically repeated errors and mismatches.

SUMMARY OF THE INVENTION

The present invention is directed towards a system and method for automatically identifying and correcting errors and mismatches with written forms produced by automatic speech recognition applications by comparing the speech output to the corresponding finished written form.

More specifically, the present invention is directed towards a method for adaptive automatic error and mismatch correction in a speech recognition system having an automatic correction module, an automatic error and mismatch detection module, and a classifier module, where the method includes receiving a string of interpreted speech into the automatic correction module, identifying target tokens in the string of interpreted speech, creating a set of classifier features according to requirements of automatic error and automatic mismatch correction model(s), comparing the target tokens against the classifier features to detect errors and mismatches in the string of interpreted speech, modifying the string of interpreted speech based upon the classifier features, and modifying the automatic error and mismatch correction model(s) based upon the errors and mismatches in the string of interpreted speech.

The method further includes generating a process report pairing the errors or mismatches in the string of interpreted speech with corrected words, wherein the process report is sent to an automatic error and mismatch correction model generation module.

The method further includes generating automatic error and mismatch correction models based upon the comparison of a set of document pairs, the first consisting of ASR output and the second the final, edited form of the first.

The present invention also is directed towards a speech recognition system having adaptive automatic error and/or mismatch correction, the system including a computer storage medium and a computer program code mechanism embedded in the computer storage medium for causing a computer to interpret a string of speech, an automatic correction module stored on the computer program code mechanism for use with receiving the string of interpreted speech, an automatic error correction model and an automatic mismatch correction model stored on the computer program code mechanism in electronic communication with the automatic correction module for use with detecting errors and/or mismatches in the string of interpreted speech, and a classifier module stored on the computer program code mechanism in electronic communication with the automatic correction module for use with correcting errors and/or mismatches in the string of interpreted speech.

The system further includes a postprocessor stored on the computer program code mechanism for use with replacing the errors in the string of interpreted speech with corrected words, and/or for replacing recognized words appropriate in spoken language with words more appropriate in written language.

The system further includes an automatic error and mismatch correction model adaptation module stored on the computer program code mechanism for use with generating automatic error and mismatch correction models based upon identifying and selecting candidate errors and mismatches between the ASR output and the corresponding final edited form of the ASR output.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present invention will now be described more fully as it applies to all embodiments. The present invention relates to a method of automatic speech recognition (ASR) for automatically detecting and correcting frequently repeated errors and mismatches. The present invention also relates to an ASR system having improved automatic error and mismatch correction (AEC) capabilities for implementing the method of speech recognition. The system of the present invention is capable of operating on conventional computer systems and computerized devices, an example of which is provided below as it relates to the preferred embodiment.

The ASR system of the present invention may be used to correct errors in strings of interpreted speech. It may also be used to correct string mismatches between interpreted speech and desired finished written reports. Additionally, this system identifies and selects candidate errors and mismatches between the output of the ASR system and final, edited versions of the output. The ASR system implements the method of the present invention. Specifically, a string of interpreted speech is received by an AEC module, where target tokens are identified in the string of interpreted speech. Next, the target tokens are analyzed in the AEC module to detect potential errors and mismatches in the string of interpreted speech. If the AEC classifier for a given target token is determined to be incorrect, the target token is corrected by the AEC module. The incorrect target tokens are replaced with corrected words, and a modified string of interpreted speech is generated.

The method of the present invention involves separate and repeated training phases, the results of which are used to correct follow-on documents. The training phase involves comparing a collection of pairs of ASR output and corresponding final written documents. Corrections are selected by their prevalence, productivity, and utility based on evidence from the training data itself. The training data comprises a set or collection of documents collected from a given speaker with some emphasis on the recent past. The training data may change in content (e.g., the subject matter of the reports may differ) or style (e.g., the reporting style may change).

In other words, there are two parts to the present invention: (1) a learning or training component; and (2) an application component. The learning/training component identifies and selects correction/modification patterns or "rules" by comparing interpreted speech (i.e., the output of the ASR) with the final edited report corresponding to the interpreted speech. This is done by comparing a set of document pairs, the first being output of the ASR and the second being the final edited version of that same ASR output. This comparison produces a set of frequency-ranked correspondences consisting of patterns found in the ASR output (including null patterns that arise when something needs to be inserted into the ASR output to produce the final edited form, such as commas, colons, and periods) and their matching targets ("mappings"). These "rules" are then evaluated by constructing candidate classifiers based on the evidence provided by the collection itself. Those rules that are deemed effective (with effectiveness being measured by the ability of the classifier to correctly predict the targets associated with the given pattern using such measures as recall, precision, and combinations such as the "F measure") are then used by the application in the future (until more data is collected and another set of classifiers is developed using more collected data).

Adaptation therefore involves a batch process that takes place periodically after sufficient data has been collected. The collection may consist of document pairs for an individual or for a group of individuals. The adaptation may be performed prior to installation of the application if sufficient training data is available from the individual or group of individuals. Furthermore, if the performance of the new model(s) does not exceed that of the existing model(s), the candidate new model(s) will not replace the existing model(s). Finally, it also is possible to generate "factory" models (developed on the basis of a large and representative sample of document pairs from multiple speakers and document types within a given domain) to be delivered as a "starter" model before adaptation to one or more users at a given site.

The present invention will now be described more fully with reference to the Figures in which an embodiment of the present invention is shown. The subject matter of this disclosure may, however, be embodied in many different forms and should not be construed as being limited to the embodiment set forth herein.

Figure 1:
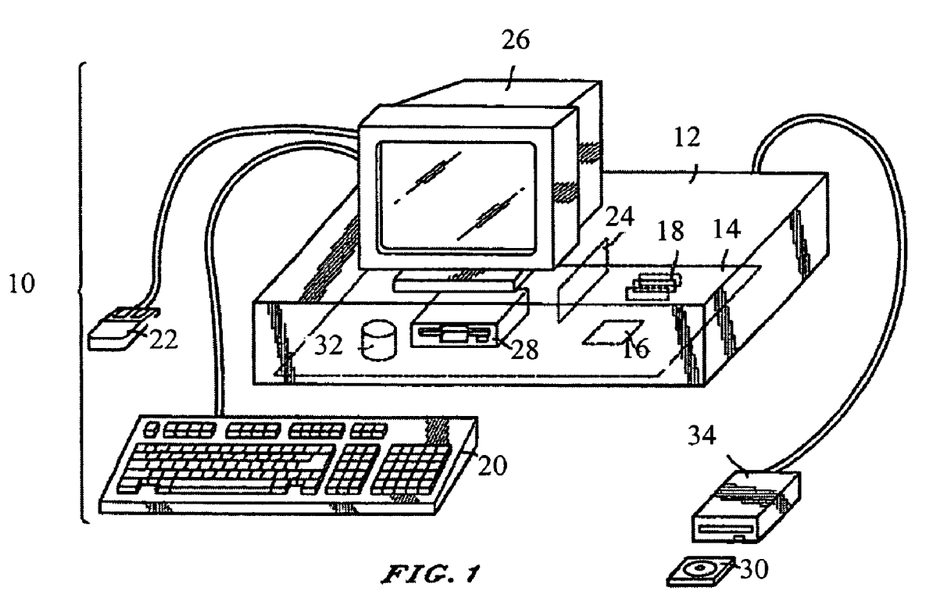
FIG. 1 is schematic illustration of a computer system for use with implementing the method of automatic speech recognition of the present invention.

Referring now to the drawings, wherein like reference numerals designate identical or corresponding parts throughout the several views, FIG. 1 is a schematic illustration of a computer system for use with implementing a method of automatic speech recognition of the present invention. A computer 10 implements the method of the present invention, wherein the computer housing 12 houses a motherboard 14 which contains a CPU 16, memory 18 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 10 also includes plural input devices (e.g., a keyboard 20 and mouse 22), and a display card 24 for controlling a monitor 26. In addition, the computer system 10 further includes a floppy disk drive 28; other removable media devices (e.g., compact disc 30, tape, and removable magneto-optical media (not shown)); and a hard disk 32, or other fixed, high density media drives, connected using an appropriate device bus (e.g., a SCSI bus, an Enhanced IDE bus, or a Ultra DMA bus). Also connected to the same device bus or another device bus, the computer 10 may additionally include a compact disc reader 34 or a compact disc reader/writer unit (not shown).

As stated above, the system includes at least one computer readable medium. Examples of computer readable media are compact discs 30, hard disks 32, floppy disks tape, magneto-optical disks, PROMs (EPROM, EEPROM, Flash EPROM), DRAM, SRAM, SDRAM, and the like. Stored on any one or on a combination of computer readable media, the present invention includes software for controlling both the hardware of the computer 10 and for enabling the computer 10 to interact with a human user. Such software may include, but is not limited to, device drivers, operating systems and user applications, such as development tools. Such computer readable media further include the computer program product of the present invention for automatically detecting and correcting frequently repeated errors and mismatches. The computer code devices of the present invention can be any interpreted or executable code mechanism, including but not limited to scripts, interpreters, ActiveX controls, dynamic link libraries, Java classes, and complete executable programs.

Figure 2:
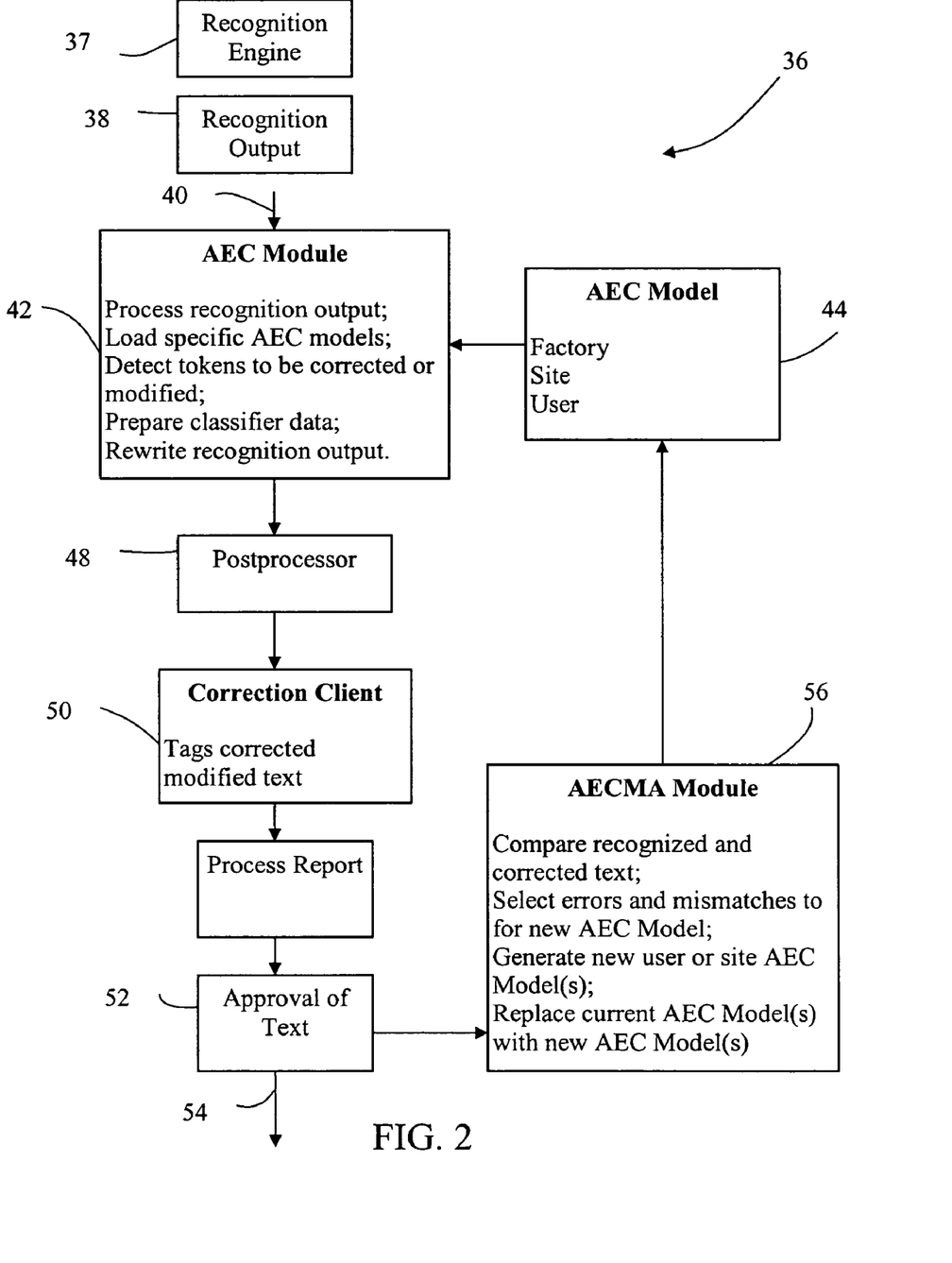
FIG. 2 is a diagram of the adaptive automatic error correction method of the present invention.

With reference to FIG. 2, an ASR system 36 is shown for implementation with computer 10. The post-recognition module of 36 acts on the output 38 of a typical engine 37. The output 38 delivers tokens 40, or strings of interpreted words or speech, to the post-recognition component of the 36. More specifically, tokens 40 are delivered to an AEC module 42, which processes the tokens as described hereafter.

Figure 3:
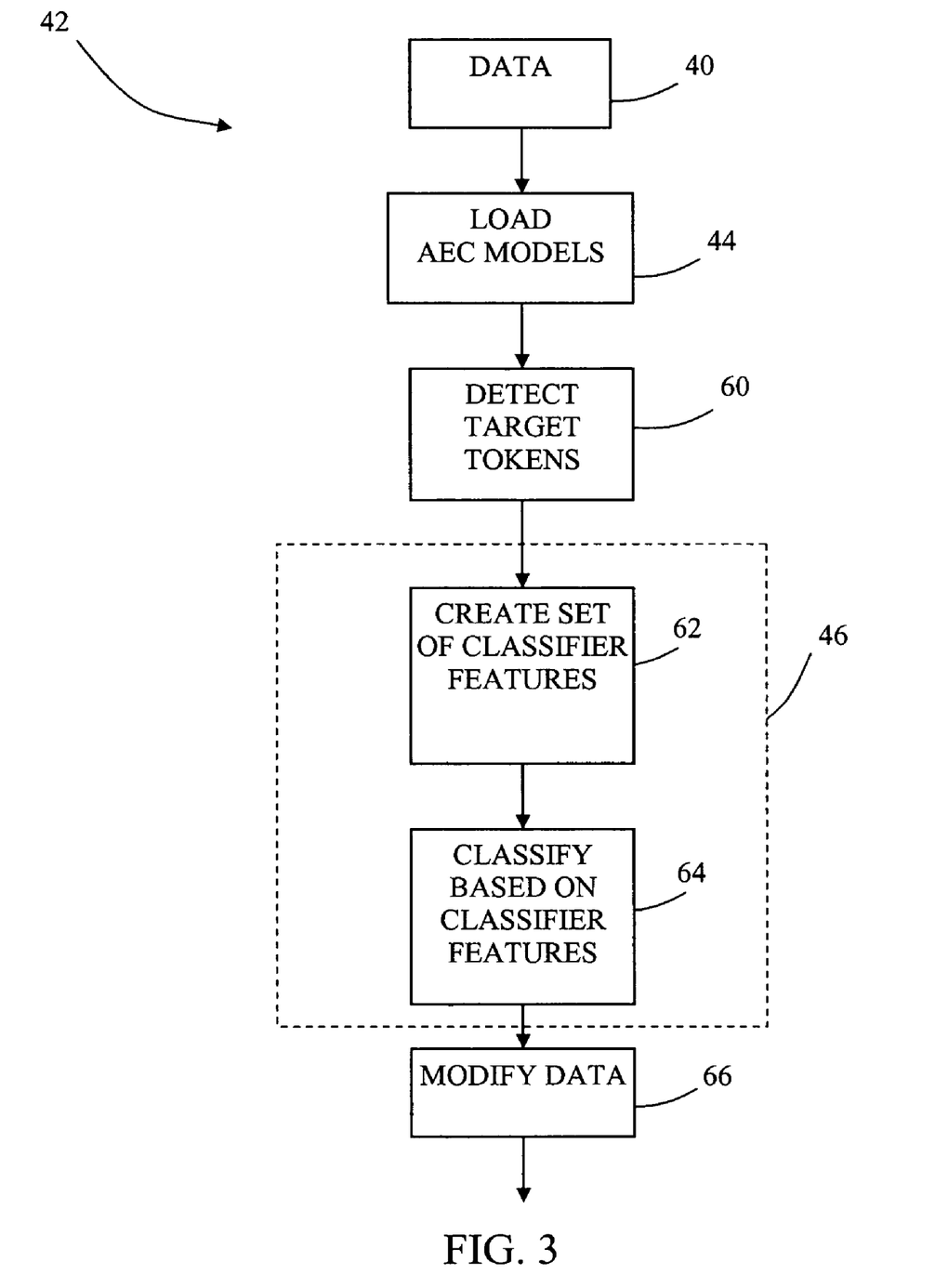
FIG. 3 is a diagram of the automatic error correction module of the present invention.

AEC module 42 processes the tokens 40 and begins the error and mismatch correction process. With reference to FIG. 3, AEC module 42 first loads one or more AEC models 44, which are files that contain specific configuration information, as described hereafter. AEC module 42 then scans the tokens 40 to detect target tokens (box 60), or specific words in the output string to be corrected. Target tokens are compiled from the AEC models 44. The AEC module 42 isolates these target tokens and prepares them for the classifier 46.

The classifier 46 first creates a set of classifier features (box 62) based on the AEC models 44. Then, the classifier 46 determines whether the target tokens are correct and matched or incorrect and mismatched by comparing the target tokens against the set of classifier features and classifying the target tokens accordingly (box 64). In box 66, data is then modified. If the classifier 46 classifies a particular target token as being correct and matched, then the token is passed along to the postprocessor 48. On the other hand, if the classifier 46 classifies a particular target tokens as being either incorrect or mismatched, then the classifier 46 corrects or rewrites the token appropriately. The AEC module 42 returns a string of rewritten target tokens, which are passed to the postprocessor 48 for further processing, as described hereafter.

Figure 4:
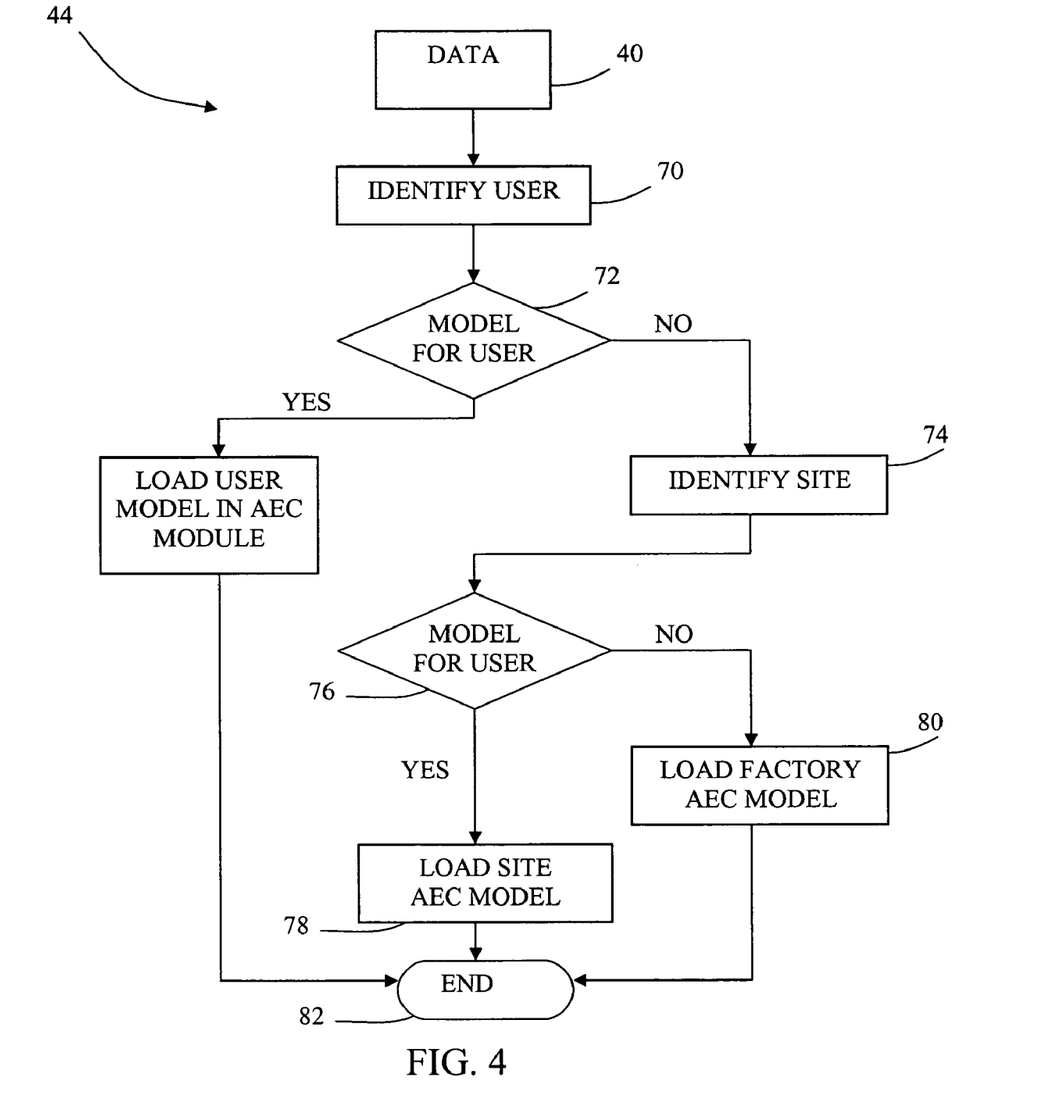
FIG. 4 is a diagram of an automatic error correction model of the present invention.

AEC models 44 contain specific information regarding the AEC module 42, as shown in FIG. 4. Specifically, the AEC models 44 contain configuration information related to the AEC module 42, which is used by the AEC module 42 to prepare the target tokens for the classifier 46. Additionally, the AEC models 44 may contain other "factory" models relating to the specific ASR system 36 or other speech recognition devices. These models adjust the AEC module 42 for limitations resulting from the ASR system 36 or other speech recognition devices. In the absence of information related to the specific user or site, as described hereafter, the AEC module 42 uses the factory models 44 as a default.

The AEC models 44 also contain information related to specific users. This may include models for a specific dialect or accent. For instance, if the native language of a speaker is Cantonese, a dialect of Chinese, the AEC model 44 may incorporate specific models to adjust the AEC module 42 for differences associated with that specific dialect. These models also might account for a speaker's individual distinctive pronunciation of certain words or phrases that otherwise would not be recognized by the ASR system 36.

Further, the AEC models 44 contain information related to the specific site. This information relates to the particular field, industry, or application in which the ASR system is being used. For instance, ASR system may be used for entering medical information into patient records. In that instance, the particular site is the medical field. As the medical field has its own terminology not found in common conversation, some of this information can be included in the AEC models 44 to prevent errors and/or mismatches from occurring during the speech recognition process.

With reference to FIG. 4, the AEC model 44 first identifies the user (box 70) and, if available, loads the appropriate user model (box 72) into the AEC module 42. If there is no user model, then the AEC model 44 identifies the site (box 72) and, if available (box 76), loads the site model (box 78) into the AEC module 42. If there is no site model, then the AEC model 44 loads the factory AEC model (box 80), which corresponds to the AEC module 42, into the AEC module 42. These particular models are then used by the AEC module 42 to classify and correct errors and mismatches in the target tokens (box 82).

Postprocessor 48 receives the target tokens from the AEC module 42, including those target tokens that were corrected or rewritten and those that were classified as already being correct and matched. The postprocessor 48 inserts the target tokens back into the interpreted speech or text. In this manner, the postprocessor 48 delivers a corrected string of interpreted text, which includes the target tokens, to the correction client 50.

Correction client 50 scans the corrected string of interpreted text and identifies those target tokens that were modified by the AEC module 42. The correction client 50 tags the modified text for use by the ASR system 36 in compiling a process report, which pairs the target token as modified by the AEC module 42 with the target token as interpreted. Correction client 50 then passes the string of modified text to the processor 52 for final approval.

The processor 52 analyzes the modified text for final approval. Upon final approval, the autotext processor 52 delivers a string of approved interpreted text to the output 54 of the ASR system. Additionally, autotext processor 52 delivers the process report to the automatic error correction model adaptation (AECMA) module 56 for improving or adapting the AEC models 42, as described hereafter.

Figure 5:
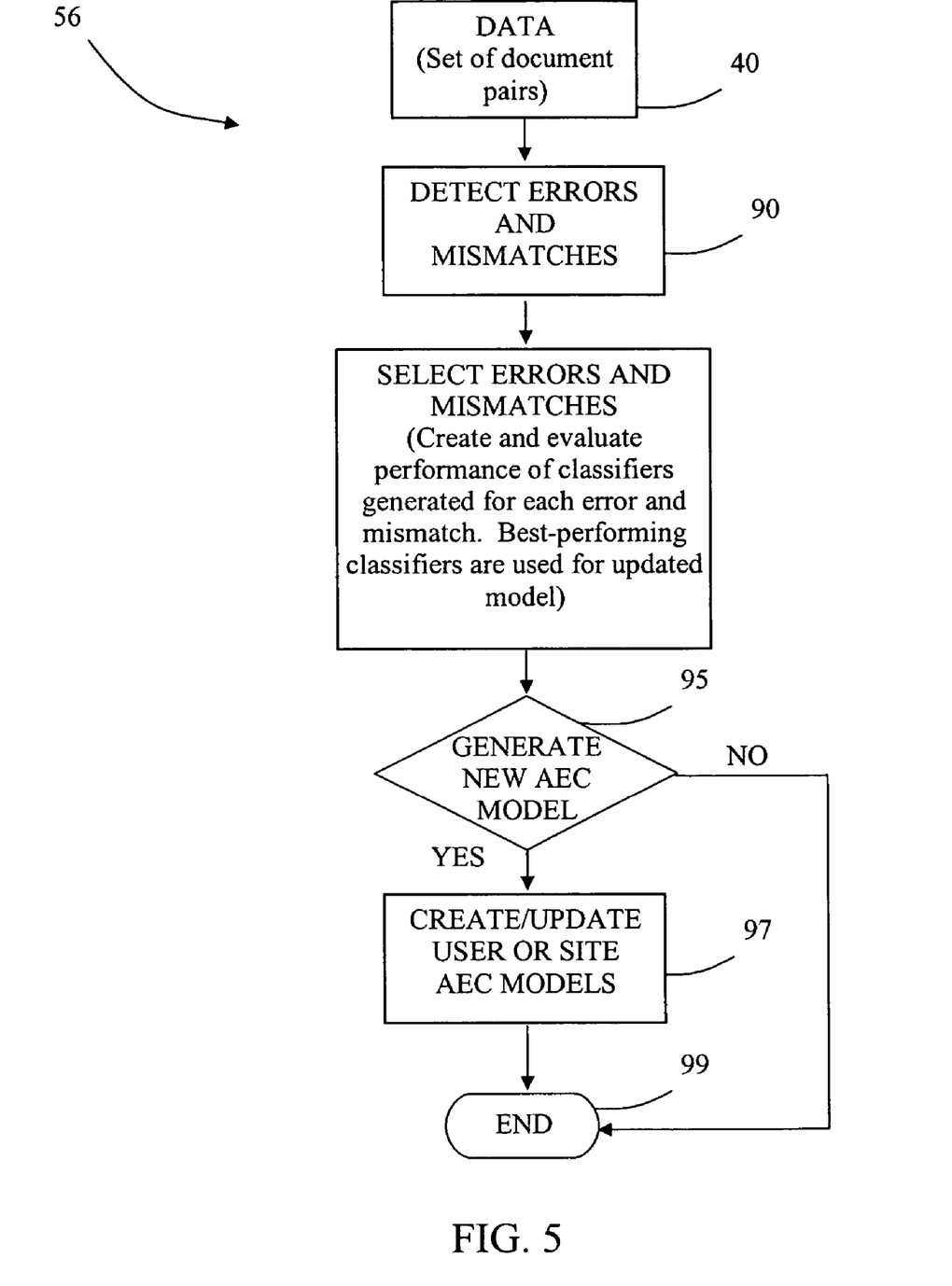
FIG. 5 is a diagram of the automatic error correction model adaptation module of the present invention.

AECMA module 56 receives the process report, which pairs the target tokens as modified by the AEC module 42 with the target tokens as interpreted, from the autotext processor 52. With reference to FIG. 5, the AECMA module 56 reviews the process report to determine the errors and mismatches (box 90) that occurred during the speech recognition process. Specifically, the AECMA module 56 selects a particular error or mismatch and determines the cause of the error or mismatch (box 92). In selecting the errors and mismatches, the performance of classifiers generated for each error and mismatch is evaluated. The best performing classifiers are then implemented. The AECMA module 56 then creates an AEC model (box 95), if none exist, or updates the current AEC models (box 97) to provide for the future classification and correction of the error or mismatch. Specifically, the AECMA module 56 creates or updates current AEC models 44 relating to the user, the site, and the ASR system 36 (box 99). For instance, if the error or mismatch is the result of infelicities or other user-dependent inconsistencies, then the AECMA module 56 creates or updates the user model. The AECMA module 56 also is capable of creating or updating the site or factory models, depending upon the specific errors or mismatches detected. In this manner, the AECMA module 56 adapts the AEC models 44, which thereby improves the performance of the AEC module 42.

In operation, the ASR recognition engine 37 sends a string of interpreted speech 38 into the AEC module 42, which identifies target tokens in the string of interpreted speech. Next, the classifier 46 within the AEC module 42 creates a set of classifier features according to requirements of the AEC model 44. The classifier 46 compares the target tokens against the classifier features to detect errors and mismatches in the string of interpreted speech 38. If a target token is incorrect, the classifier corrects the target token. If the target token is a mismatch, the classifier modifies the target token to match final report text. Next, the postprocessor 48 modifies the string of interpreted speech 38 by replacing errors and mismatches with their corrected and modified words. The correction client 50 generates a process report, pairing the errors and mismatches in the string of interpreted speech with their corrected and modified words. The process report is sent to the AECMA module 56, which uses the errors and mismatches listed within the process report to modify one or more AEC models 44. Additionally, the modified string of speech 54 is passed on from the ASR system 36 for use with other applications.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

The invention claimed is:

1. A speech recognition system having adaptive automatic error and mismatch correction comprising:
   a computer storage medium and a computer program code mechanism embedded in the computer storage medium for causing a computer to interpret a string of speech;
   an automatic error and mismatch correction module stored on said computer program code mechanism for use with receiving said string of interpreted speech;
   a plurality of automatic error and mismatch correction models stored on said computer program code mechanism in electronic communication with said automatic error and mismatch correction module operatively configured to detect errors and mismatches in said string of interpreted speech and generate a process report;
   an automatic error correction model adaptation module operatively configured to improve said automatic error and mismatch correction models based on said process report; and
   a classifier module stored on said computer program code mechanism in electronic communication with said automatic error and mismatch correction module operatively configured to correct errors and mismatches in said string of interpreted speech.

2. The device of claim 1 further comprising a postprocessor stored on said computer program code mechanism for use with replacing said errors and mismatch in said string of interpreted speech with corrected and modified words.

3. The device of claim 1 further comprising a correction editing client stored on said computer program code mechanism for generating a process report pairing said errors and mismatches in said string of interpreted speech with corrected and modified words.

4. The device of claim 3 further comprising an automatic error and mismatch correction model adaptation module for use with modifying said automatic error and mismatch correction mold based upon comparing interpreted speech and final edited documents to identify and select errors and mismatches.

5. A method for adaptive automatic error and mismatch correction in a speech recognition system having an automatic error and mismatch correction module, automatic error and mismatch correction models, and a classifier module, the method comprising the steps of:
   receiving a string of interpreted speech into the automatic error and mismatch correction module;
   identifying target tokens in said string of interpreted speech;

selecting an automatic error and mismatch correction model from a set comprising a specific user model, a specific site model, and a factory model;

creating a set of classifier features according to requirements of the automatic error and mismatch correction model;

comparing said target tokens against said classifier features to detect errors and mismatches and to classify said target tokens;

correcting said target tokens for which said errors and mismatches are detected;

correcting said string of interpreted speech by replacement of said erroneous target tokens with said corrected target tokens;

evaluating the performance of said classifiers and identifying the best performing classifiers; and improving said error and mismatch correction models by implementing said best performing. classifiers.

6. The method of claim 5 wherein the automatic error and mismatch adaptation module generates and replaces the existing error and mismatch classifier data.

7. The method of claim 5 wherein the classifier features are created according to the requirements of an automatic error and mismatch correction model associated with the speech recognition system.

8. A method for adaptive automatic error and mismatch correction in a speech recognition system having an automatic error correction model adaptation module comprising the steps of:

receiving a string of interpreted speech in the automatic error correction model adaptation module;

receiving a corresponding string of the final, edited form of said interpreted speech;

comparing said string of interpreted speech and said corresponding string of the final, edited form of the interpreted speech;

identifying mismatching target tokens in said string of interpreted speech and their corresponding targets in said final edited form of the interpreted speech;

creating patterns or rules consisting of source patterns in said string of interpreted speech and re-write patterns in said final, edited form of the interpreted speech;

creating a set of classifier features based on one of a plurality of automatic error and mismatch correction models;

evaluating the performance of the patterns or rules by determining the effectiveness or success of classifiers in identifying correct and incorrect patterns in interpreted speech using metrics chosen from a group comprising recall, precision, and F-Measure;

using said metrics to select classifiers.

9. The method of claim 8 wherein the classifier features are created according. to the requirements of an automatic error and mismatch correction model associated with the speech recognition system.

10. The method of claim 9 further comprising the step of generating said automatic error and mismatch correction model based upon the comparison of the errors and/or mismatches in said string of interpreted speech and the final edited form of this interpreted speech.

11. The method of claim 10 wherein said automatic error and mismatch correction model is replaced based upon a process report.

* * * * *